US012449150B1

(12) United States Patent
Wang et al.

(10) Patent No.: US 12,449,150 B1
(45) Date of Patent: Oct. 21, 2025

(54) COOPERATIVE CONTROL OPTIMIZATION METHOD SUITABLE FOR NEAR-FIELD FAN WALL MICROMODULE (71) Applicants: CHINA CONSTRUCTION INDUSTRIAL & ENERGY ENGINEERING GROUP CO., LTD., Suzhou (CN); Nanjing Tech University, Suzhou (CN)

(72) Inventors: Ligang Wang, Suzhou (CN); Depeng Li, Suzhou (CN); Tao Deng, Suzhou (CN); Wei Liu, Suzhou (CN); Yumao Lin, Suzhou (CN); Meng Li, Suzhou (CN); Qing Huang, Suzhou (CN); Yizhe Xu, Suzhou (CN); Chengchu Yan, Suzhou (CN)

(73) Assignees: CHINA CONSTRUCTION INDUSTRIAL & ENERGY ENGINEERING GROUP CO., LTD., Jiangsu (CN); Nanjing Tech University, Jiangsu (CN)

( * ) Notice: Subject to any disclaimer, the term of this patent is extended or adjusted under 35 U.S.C. 154(b) by 0 days.

(21) Appl. No.: 19/227,423

(22) Filed: Jun. 3, 2025

Related U.S. Application Data (63) Continuation of application No. PCT/CN2024/107623, filed on Jul. 25, 2024.

(30) Foreign Application Priority Data

Jul. 5, 2024 (CN) .......................... 202410900768.8

(51) Int. Cl.
F24F 11/46 (2018.01)
F24F 11/63 (2018.01)
H05K 7/20 (2006.01)

(52) U.S. Cl.
CPC .............. *F24F 11/46* (2018.01); *F24F 11/63* (2018.01); *H05K 7/20745* (2013.01)

(58) Field of Classification Search
None
See application file for complete search history.

(56) References Cited

U.S. PATENT DOCUMENTS

| 2016/0094477 A1* | 3/2016 | Bai ........................ H04L 47/786 709/226 |
| 2023/0259102 A1* | 8/2023 | Misra ................. H05K 7/20836 700/300 |
| 2025/0138609 A1* | 5/2025 | Ghose ..................... G06F 1/206 |

FOREIGN PATENT DOCUMENTS

| CN | 111174375 | 5/2020 |
| CN | 111625321 | 9/2020 |

(Continued)

OTHER PUBLICATIONS

Qing Huang et al., "High-Efficiency Cloud Data Center System Design for Business Workloads", New Generation of Information Technology, Aug. 2013, pp. 32-38, with English abstract, vol. 6, No. 15.

(Continued)

*Primary Examiner* — Thomas C Lee
*Assistant Examiner* — Anzuman Sharmin
(74) *Attorney, Agent, or Firm* — JCIPRNET (57) ABSTRACT A cooperative control optimization method suitable for a near-field fan wall micromodule, comprising the following steps: step 10: obtaining IT system scheduling data and air-conditioning system data of the near-field fan wall micromodule within a preset period of time, and separately establishing a micromodule server real-time power model, an air-conditioning system power model, and a rapid server temperature prediction model; and step 20: performing cooperative control on deployment of virtual machines and (Continued)

an air-conditioning system by using an optimization method of combining real-time joint optimization and timed decoupling optimization based on the micromodule server real-time power model, the air-conditioning system power model, and the rapid server temperature prediction model. The present invention provides a cooperative control optimization method suitable for a near-field fan wall micromodule, to resolve the technical problem that local hot spots and overcooling are prone to occur during energy-saving scheduling of a near-field fan wall micromodule.

7 Claims, 2 Drawing Sheets

(56) References Cited

FOREIGN PATENT DOCUMENTS

| CN | 111935952 | 11/2020 | | |
|----|-----------|---------|---|---|
| CN | 117435451 | 1/2024 | | |
| CN | 117891578 | 4/2024 | | |
| CN | 117930647 | 4/2024 | | |
| EP | 3525563 A1 | * | 8/2019 | ........... G06F 9/5094 |
| EP | 3228958 B1 | * | 5/2021 | .............. F24F 11/62 |
| WO | 2016078483 | 5/2016 | | |
| WO | 2019154739 | 8/2019 | | |

OTHER PUBLICATIONS

Jiebei Zhu et al., "Data Center Server Power Consumption Model Based on Temperature Estimation Considering CPU Working State", Automation of Electric Power Systems, Jul. 25, 2023, pp. 140-148, with English abstract, vol. 47, No. 14.

Xiaobing Xiong et al., "Research on effect of VM consolidation to Internet data centers' temperature and power", Application Research of Computers, Nov. 2017, pp. 3316-3320, with English abstract, vol. 34, No. 11.

Xiao-Gang Zhao et al., "Energy Saving Scheduling Strategy Based on Model Prediction Control for Data Centers", Journal of Software, Feb. 2017, pp. 429-442, with English abstract, vol. 28, No. 2.

"Written Opinion of the International Searching Authority (Form PCT/ISA/237) of PCT/CN2024/107623", mailed on Mar. 11, 2025, pp. 1-4.

* cited by examiner

COOPERATIVE CONTROL OPTIMIZATION METHOD SUITABLE FOR NEAR-FIELD FAN WALL MICROMODULE

CROSS-REFERENCE TO RELATED APPLICATION

This application is a continuation of international application of PCT application serial no. PCT/CN2024/107623, filed on Jul. 25, 2024, which claims the priority benefit of China application no. 202410900768.8, filed on Jul. 5, 2024. The entirety of each of the above mentioned patent applications is hereby incorporated by reference herein and made a part of this specification.

BACKGROUND

Technical Field

The present invention relates to the field of air-cooling control technologies in data centers, and specifically, to a cooperative control optimization method suitable for a near-field fan wall micromodule.

Description of Related Art

A near-field fan wall air conditioner is currently one of the air-cooling technologies with the highest heat exchange efficiency in data centers, and it is widely applied in various high-power-density data centers. However, in actual engineering projects, the energy-saving scheduling of the IT system and the cooling system within a near-field fan wall micromodule is currently carried out separately. That is, the cloud platform of the IT system usually adopts a scheduling policy that prioritizes the least active servers, while the near-field fan wall air conditioner employs a feedback control policy based on the supply and return air temperatures (typically, the fan frequency is controlled according to the supply air temperature, and the coil evaporation temperature is regulated based on the return air temperature). Due to the lack of effective coordination between the two systems, problems such as local hot spots and overcooling are prone to occur. This leads to a situation where a decrease in energy consumption of one system is often accompanied by an increase in the other (i.e., the energy consumption of the IT system and the energy consumption of the cooling system fluctuate inversely), and significantly impacts the safety and stability of the data center.

To improve the precise cooling supply capability of the near-field fan wall air conditioner, an effective approach is to predict the chip temperature of servers based on the real-time power changes of the servers within the micromodule, so as to regulate the air volume at each terminal of the near-field fan wall air conditioner and the evaporation temperature of the coil. However, constrained by the characteristics of fluid distribution and heat capacity, cooling systems represented by the near-field fan wall air conditioner exhibit significant issues of time lag and regulation precision during the cooling supply process, making it difficult to dynamically match the variations in the heat dissipation of each server. Consequently, this technology has failed to fundamentally resolve the problem of cold-hot mismatch in data centers.

SUMMARY

The present invention provides a cooperative control optimization method suitable for a near-field fan wall micromodule, to resolve the technical problem that local hot spots and overcooling are prone to occur during energy-saving scheduling of a near-field fan wall micromodule, so as to improve the overall energy efficiency and operation stability of the near-field fan wall micromodule.

To resolve the foregoing technical problem, the present invention adopts the following technical solution:

the present invention provides a cooperative control optimization method suitable for a near-field fan wall micromodule, comprising the following steps:

step 10: obtaining IT system scheduling data and air-conditioning system data of the near-field fan wall micromodule within a preset period of time, and separately establishing a micromodule server real-time power model, an air-conditioning system power model, and a rapid server temperature prediction model; and step 20: performing cooperative control on deployment of virtual machines and an air-conditioning system by using an optimization method of combining real-time joint optimization and timed decoupling optimization based on the micromodule server real-time power model, the air-conditioning system power model, and the rapid server temperature prediction model.

In a preferred embodiment, the IT system scheduling data comprises CPU resource requirements of the virtual machines, mapping relationships between the virtual machines and servers, a CPU utilization rate of each server, areal-time power of each server, and a chip temperature of each server; and the air-conditioning system data comprises a fan frequency of each cooling terminal, a coil evaporation temperature, an outdoor unit condensing temperature, a load ratio, and a total power of the air-conditioning system.

In a preferred embodiment, in the step 10, the micromodule server real-time power model is established according to the IT system scheduling data; and the step 10 specifically comprises:

step 101: selecting power data of each server at different chip temperatures and CPU utilization rates from the IT system scheduling data;

step 102: establishing a server static power matrix according to power data of the server in a state in which the CPU utilization rate is 0;

step 103: fitting a conversion coefficient between the CPU utilization rate and a dynamic power of each server according to data of variation of the real-time power of each server with the CPU utilization rate by using a multiple linear regression method, to form a conversion coefficient matrix of the CPU utilization rates and the dynamic powers;

step 104: fitting an expression of a leakage power of each server by using the multiple linear regression method according to different temperature data of a chip of each server at a same CPU utilization rate, to form a server leakage power matrix; and step 105: combining the server static power matrix, the conversion coefficient matrix of the CPU utilization rates and the dynamic powers, and the server leakage power matrix, to obtain the micromodule server real-time power model expressed as formula (1):

$$P_{PM}(t) = P_{SC}(t) + u_{VM}(t) * MM_{VM \to PM}(A(t), F(t)) * f_h + D(T_{PM}(t)) \quad \text{Formula (1)},$$

wherein $P_{PM}(t)$ represents a real-time power matrix for the servers, $P_{SC}(t)$ represents the server static power matrix, $u_{vm}(t)$ represents the CPU resource requirement matrix of the virtual machines, $MM_{VM \to PM}(A(t), F(t))$ represents a mapping matrix between the virtual machines and the servers, A(t) represents a real-time deployment matrix of the virtual machines, F(t) represents a virtual machine migration matrix, $u_{vm}(t)*MM_{VM \to PM}(A(t),F(t))$ represents the CPU utilization rates of all servers, $f_h$ represents the conversion coefficient matrix of the CPU utilization rates and the dynamic powers, and $D(T_{PM}(t))$ represents the server leakage power matrix.

In a preferred embodiment, in the step 10, the air-conditioning system power model expressed as formula (2) is established according to the air-conditioning system data:

$$P_{FC}(t)=P_{CP}(T_{co}(t),T_{ev}(t),PLR(t))+\Sigma P_{FX}(FP(t)) \quad \text{formula (2),}$$

wherein $P_{FC}(t)$ represents the total power of the air-conditioning system, $P_{CP}(T_{co}(t),T_{ev}(t), PLR(t))$ represents an outdoor unit power, $T_{co}(t)$ represents the coil evaporation temperature, $T_{ev}(t)$ represents the outdoor unit condensing temperature, PLR(t) represents a load ratio, FP (t) represents a fan frequency matrix of each cooling terminal, and $P_{FX}(FP(t))$ represents a power matrix for each cooling terminal.

In a preferred embodiment, in the step 10, the rapid server temperature prediction model is established according to the IT system scheduling data and the air-conditioning system data; and the step 10 specifically comprises:

step 131: selecting a mapping relationship between the virtual machines and the servers, CPU resource requirements of the virtual machines, and the chip temperature of each server from the IT system scheduling data, and selecting the fan frequency and the coil evaporation temperature of each cooling terminal from the air-conditioning system data, to form a modeling data set; and step 132: training a BP neural network model based on the modeling data set by using the fan frequency of each cooling terminal, the coil evaporation temperature, and the CPU utilization rate of each server as input variables of the BP neural network model, and using the chip temperature of each server as an output variable of the BP neural network model, to obtain the rapid server temperature prediction model.

In a preferred embodiment, in the step 20, the performing cooperative control on deployment of virtual machines and an air-conditioning system by using an optimization method of combining real-time joint optimization and timed decoupling optimization comprises:

step 21: when a cloud platform receives a deployment request for a new virtual machine, performing joint optimization on a deployment location of the new virtual machine and the fan frequency of each cooling terminal, to achieve a lowest overall power of servers and each cooling terminal under deployment of an individual virtual machine; and step 22: at each given moment, first performing whole migration on a virtual machine running on each server, so that a total power of the servers is the lowest; then, performing optimization on the coil evaporation temperature and the fan frequency of each cooling terminal of the air-conditioning system, to achieve a lowest overall power of the air-conditioning system.

In a preferred embodiment, the step 21 specifically comprises:

step 211: after the cloud platform receives the deployment request for the new virtual machine, traversing remaining CPU resources of all active servers according to a CPU resource requirement of the new virtual machine, to search for a server available for deployment;

step 212: if there is a server available for deployment, using a location of the server available for deployment as an optimization variable for the deployment of the new virtual machine, and performing step 213; if remaining CPU resources of all of the active servers are not suitable for the deployment of the new virtual machine, randomly switching a dormant server to an active state, deploying the new virtual machine, and performing step 214;

step 213: performing joint optimization on the deployment location of the new virtual machine and the fan frequency of each cooling terminal by using a genetic algorithm by using, as an optimization objective, a sum of the total power of servers and the total power of cooling terminals being minimum after the deployment, and by using, as optimization constraints, a sum of resources used by all of the virtual machines running on each server not exceeding a rated total resource quantity of the server and the chip temperature of each server not exceeding a preset temperature threshold, to obtain an optimal real-time deployment location of the virtual machine and an optimal fan frequency of each cooling terminal; carrying out, by the cloud platform, the deployment of the new virtual machine according to the optimal real-time deployment location of the virtual machine, and controlling, by the air-conditioning system, the fan frequency of each cooling terminal according to the optimal fan frequency of each cooling terminal; and step 214: performing optimization on the fan frequency of each cooling terminal by using the genetic algorithm by using, as an optimization objective, a sum of the power of each cooling terminal after the deployment of the new virtual machine being minimum, and by using, as a constraint, the chip temperature of each server not exceeding the preset temperature threshold, to obtain an optimal fan frequency of each cooling terminal; and controlling, by the air-conditioning system, the fan frequency of each cooling terminal according to the optimal fan frequency of each cooling terminal.

In a preferred embodiment, the step 22 specifically comprises:

step 221: calculating, at a given moment, a minimum quantity of active servers needed according to a sum of a quantity of all virtual machines running on the servers and CPU resource requirements of the virtual machines;

step 222: selecting a server as an active server in a next period of time according to the minimum quantity of active servers needed and according to an order of serial numbers of racks and an order of serial numbers of servers on each rack, until a quantity of selected servers reaches the minimum quantity of active servers;

step 223: uniformly migrating the existing virtual machines to the selected active servers according to a load balancing policy; enabling an idle server to sleep;

step 224: performing optimization on the coil evaporation temperature and the fan frequency of each cooling terminal by using the genetic algorithm by using, as an optimization objective, the total power of the air-conditioning system being minimum, and by using, as a constraint, the chip temperature of each server not exceeding a preset temperature threshold, to obtain an optimal coil evaporation temperature and an optimal fan frequency of each cooling terminal; and step 225: performing, by the air-conditioning system, regulation on the coil evaporation temperature according to the optimal coil evaporation temperature, and performing control on the fan frequency of each cooling terminal according to the optimal fan frequency of each cooling terminal.

Compared with the prior art, the technical solution of the present invention has the beneficial effects:

According to the cooperative control optimization method suitable for a near-field fan wall micromodule provided in the present invention, first, IT system scheduling data and air-conditioning system data of the near-field fan wall micromodule are obtained within a preset period of time, and a micromodule server real-time power model, an air-conditioning system power model, and a rapid server temperature prediction model of the near-field fan wall micromodule are separately established; then, in the control phase, when real-time deployment optimization is used, joint optimization is performed on the deployment location of a newly arrived virtual machine and the fan frequency of each cooling terminal, to improve the real-time matching degree between heat dissipation of the server and cooling supply at terminals of an air conditioner, so as to reduce the probability of occurrence of local hot spots and overcooling in the micromodule, to minimize the overall power of the servers and the air conditioner terminals under deployment of an individual virtual machine. When timed decoupling optimization is adopted, whole migration is first performed on the virtual machines running on each server at a given time point, so that a total power of the servers is the lowest. Based on this, optimization is performed on the coil evaporation temperature of the air-conditioning system and the fan frequency of each cooling terminal, to achieve a lowest overall power of the air-conditioning system, and facilitate a high timing match between heat dissipation of the servers and cooling supply of the air conditioner, thereby further improving the utilization efficiency of cold energy. By coordination of the real-time joint optimization and the timed decoupling optimization, the overall energy efficiency and the operational stability of the near-field fan wall micromodule can be improved. The method of the present invention starts from the cooperative control of servers and a near-field fan wall air conditioner, and aims to fundamentally resolve the problem of cold-hot mismatch in data centers, so as to achieve an optimal overall energy efficiency of the servers and the near-field fan wall air conditioner.

BRIEF DESCRIPTION OF THE DRAWINGS

To describe the technical solutions of the embodiments of the present invention more clearly, the following briefly introduces the accompanying drawings to be used in the embodiments of the present invention. Apparently, the accompanying drawings in the following description show only some embodiments of the present invention, and a person of ordinary skill in the art may still derive others drawings from these accompanying drawings without creative efforts.

In the figures, a near-field fan wall micromodule 1, a rack 11, a server 12, a cooling terminal 21, a fan 22, an evaporator coil 23, are refrigerant pipeline 24, and an outdoor unit 25.

DESCRIPTION OF THE EMBODIMENTS

The technical solutions of the present invention will be described in detail below with reference to the accompanying drawings.

Figure 4:
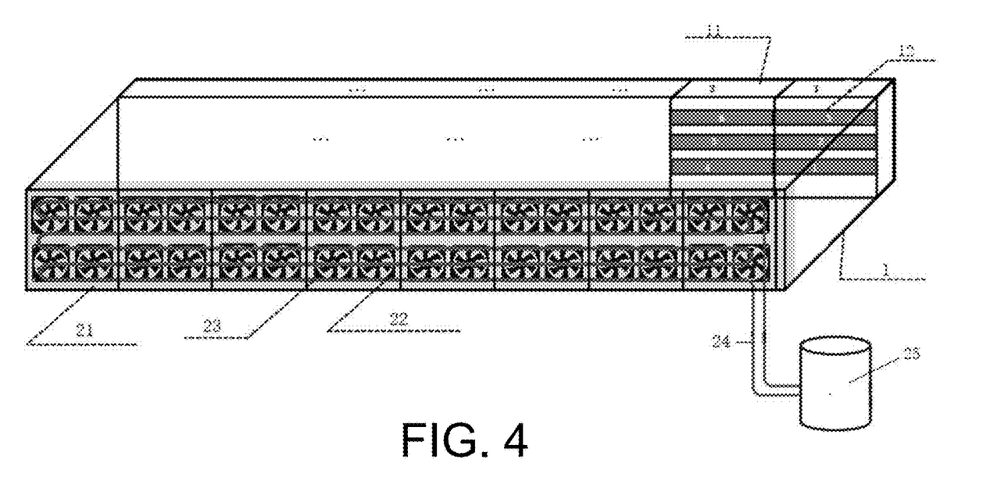
FIG. 4 is a schematic structural diagram of a near-field fan wall micromodule suitable for a method in an embodiment of the present invention.

An embodiment of the present invention provides a cooperative control optimization method suitable for a near-field fan wall micromodule, applied to a near-field fan wall micromodule 1 shown in FIG. 4. The near-field fan wall micromodule 1 includes N racks 11, each of which is provided with M servers 12. The near-field fan wall includes N cooling terminals 21 that are in a one-to-one correspondence with the N racks 11, fans 22 in an individual cooling terminal can only uniformly convert frequencies, and an evaporator coil 23 is connected to an outdoor unit 25 (including a condenser, a compressor, and a throttling device) through a refrigerant pipeline 24.

Figure 1:
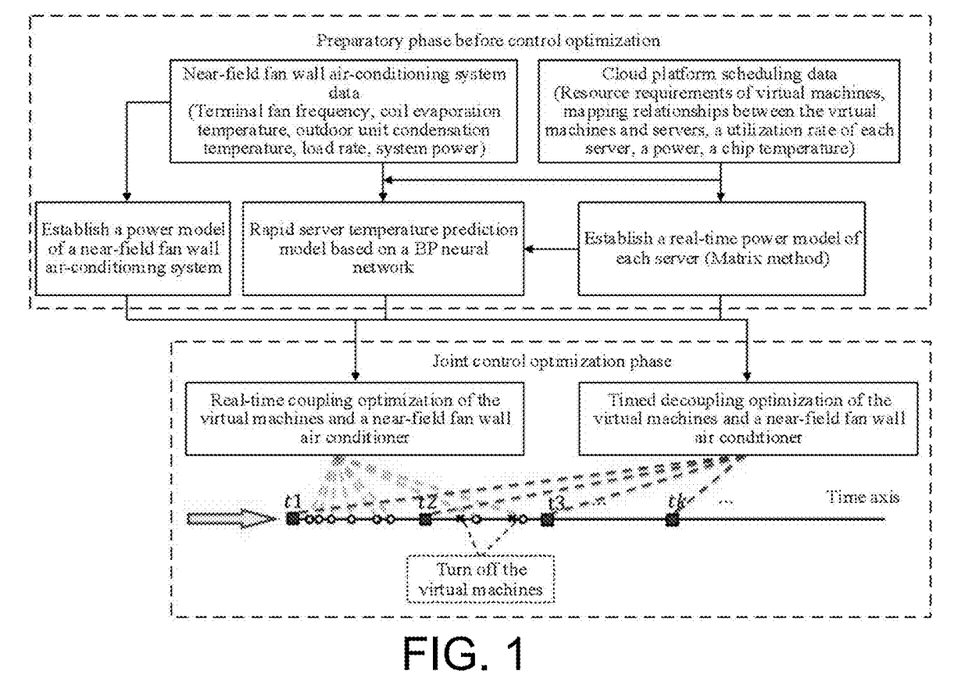
FIG. 1 is a flowchart of a cooperative control optimization method according to an embodiment of the present invention.

The cooperative control optimization method suitable for a near-field fan wall micromodule provided in an embodiment of the present invention, as shown in FIG. 1, includes the following steps:

Step 10: Obtain IT system scheduling data and air-conditioning system data of a near-field fan wall micromodule within a preset period of time; establish a micromodule server real-time power model of the near-field fan wall micromodule according to the IT system scheduling data; establish an air-conditioning system power model of the near-field fan wall micromodule according to the air-conditioning system data; and establish a rapid server temperature prediction model of the near-field fan wall micromodule according to the IT system scheduling data and the air-conditioning system data.

Step 20: Perform cooperative control on deployment of virtual machines and an air-conditioning system by using an optimization method of combining real-time joint optimization and timed decoupling optimization based on the micromodule server real-time power model, the air-conditioning system power model, and the rapid server temperature prediction model.

In the foregoing step 10, the IT system scheduling data is obtained from scheduling data stored on a cloud platform. The IT system scheduling data includes CPU resource requirements of the virtual machines, mapping relationships between the virtual machines and servers, a CPU utilization rate of each server, a real-time power of each server, and a chip temperature of each server. The air-conditioning system data is obtained from a management system integrated within the near-field fan wall air-conditioning system. The air-conditioning system data includes the fan frequency of each cooling terminal, a coil evaporation temperature, an outdoor unit condensing temperature, a load ratio, and the total power consumption of the air-conditioning system. Preferably, the preset period of time is not less than 24 hours.

In foregoing step 10, it is assumed that each server is homogeneous, and the micromodule server real-time power model is established by using a matrix modeling method according to the IT system scheduling data.

The step 10 specifically includes:

Step 101: Select power data of each server at different chip temperatures and CPU utilization rates from the IT system scheduling data.

Step 102: Establish a server static power matrix according to power data of the servers in a state in which the CPU utilization rate is 0.

Step 103: Fit a conversion coefficient between the CPU utilization rate and a dynamic power of each server according to data of variation of the real-time power of each server with the CPU utilization rate by using a multiple linear regression method (in a standard operating condition of the server, the real-time power minus the static power is the dynamic power), to form a conversion coefficient matrix of the CPU utilization rates and the dynamic powers.

Step 104: Fit an expression of a leakage power of each server by using the multiple linear regression method according to different temperature data of a chip of each server at a same CPU utilization rate, to form a server leakage power matrix.

Step 105: Combine the server static power matrix, the conversion coefficient matrix of the CPU utilization rates and the dynamic powers, and the server leakage power matrix, to obtain the micromodule server real-time power model expressed as formula (1):

$$P_{PM}(t)=P_{SC}(t)+u_{vm}(t)*MM_{VM \to PM}(A(t),F(t))*f_h+D(T_{PM}(t)) \quad \text{formula (1)},$$

where $P_{PM}(t)$ represents a real-time power matrix for the servers, each element in the matrix $P_{PM}(t)$ represents a real-time power model of one server, that is, each element is in a one-to-one correspondence with the server in the near-field fan wall micromodule, and one element represents a power model of one server; $P_{SC}(t)$ represents a server static power matrix, and $u_{VM}(t)$ represents a CPU resource requirement matrix of the virtual machines; and $MM_{VM \to PM}(A(t),F(t))$ represents a mapping matrix between the virtual machines and the servers, and is a function of a real-time deployment matrix $A(t)$ of the virtual machines and a migration matrix $F(t)$ of the virtual machines, which may be represented in a matrix form of (0, 1). For example, $$\begin{bmatrix} VM \backslash PM & PM_1 & PM_1 & ... \\ VM_1 & 1 & 0 & ... \\ VM_2 & 0 & 1 & ... \\ ... & ... & ... & ... \end{bmatrix}$$

represents that the No. 1 virtual machine is deployed on the No. 1 server, and the No. 2 virtual machine is deployed on the No. 2 server. $u_{VM}(t)*MM_{VM \to PM}(A(t),F(t))$ represents the CPU utilization rates of all servers, $f_h$ represents a conversion coefficient matrix of the CPU utilization rates and the dynamic powers, and $D(T_{PM}(t))$ represents a server leakage power matrix.

In the established micromodule server real-time power model, the real-time power of the server includes the static power, the dynamic power, and the leakage power. The static power is a fixed value related to the server performance, the dynamic power is a function of the CPU utilization rate of the server, and the leakage power is a function of the CPU chip temperature of the server.

In foregoing step 10, the air-conditioning system power model expressed as formula (2) is established according to the air-conditioning system data:

$$P_{FC}(t)=P_{CP}(T_{co}(t),T_{ev}(t),PLR(t))+\Sigma P_{FX}(FP(t)) \quad \text{formula (2)},$$

where $P_{FC}(t)$ represents the total power of the air-conditioning system; $P_{CP}(T_{co}(t),T_{ev}(t),PLR(t))$ represents the outdoor unit power, and is a function of the coil evaporation temperature $T_{co}(t)$, the outdoor unit condensing temperature $T_{ev}(t)$, and the load ratio PLR(t); $P_{FX}(FP(t))$ represents a power matrix foreach cooling terminal, and is a function of a fan frequency matrix FP(t) for each cooling terminal.

In the step 10, the BP neural network model is established, and a dynamic mapping relationship among the fan frequency of each cooling terminal, the coil evaporation temperature, and the CPU utilization rate of each server is formed by using the fan frequency of each cooling terminal, the coil evaporation temperature, the CPU utilization rate of each server, and the chip temperature of each server as input variables, and using the chip temperature of each server as an output variable.

The step 10 specifically includes:

Step 131: Select a mapping relationship between the virtual machines and the servers, CPU resource requirements of the virtual machines, and the chip temperature of each server from the IT system scheduling data, and select the fan frequency and the coil evaporation temperature of each cooling terminal from the air-conditioning system data, to form a modeling data set. The modeling data set is divided into a training set and a test set by 4:1.

Step 132: Train a BP neural network model using a training set by using the fan frequency of each cooling terminal, the coil evaporation temperature, and the CPU utilization rate of each server (which is obtained through calculation according to a mapping relationship between the virtual machines and servers and CPU resource requirements of the virtual machines) as input variables of the BP neural network model, and by using the chip temperature of each server as an output variable of the BP neural network model, and optimize hyper-parameters such as a quantity of layers of the model and a quantity of neurons of each layer in a training process.

The precision of the trained BP neural network model is tested by using a test set. If a model error meets a requirement (for example, less than 1%), the model is considered to be qualified, and a rapid server temperature prediction model is obtained.

In the step 20, the performing cooperative control on the deployment of virtual machine sand an air-conditioning system by using an optimization method of combining real-time joint optimization and timed decoupling optimization includes:

Step 21: When a cloud platform receives a deployment request for a new virtual machine, perform joint optimization on a deployment location of the virtual machine and the fan frequency of each cooling terminal, to achieve a lowest overall power of the servers and each cooling terminal under deployment of an individual virtual machine.

Step 22: At each given moment, first perform whole migration on virtual machines running on each server, so that a total power of the servers is the lowest. On this basis, optimization is performed on the coil evaporation temperature and the fan frequency of each cooling terminal of the air-conditioning system, so as to achieve a lowest overall power of the air-conditioning system. Preferably, a duration between two adjacent specified moments is 3 to 15 minutes.

Figure 2:
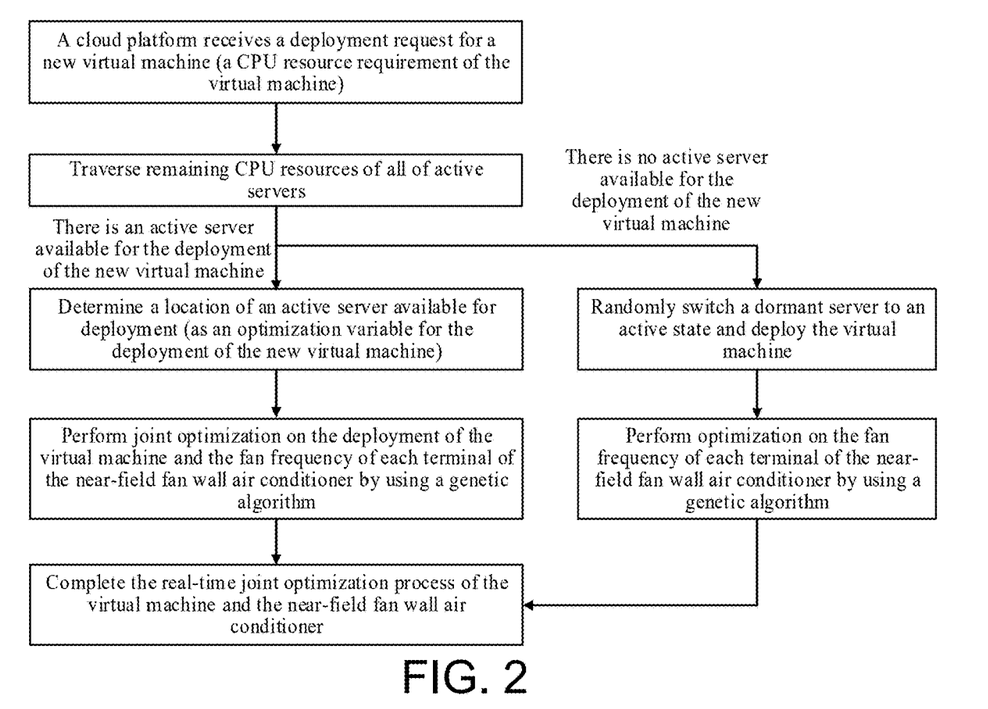
FIG. 2 is a flowchart of performing joint optimization on deployment of virtual machines and an air-conditioning system in real time in a method according to an embodiment of the present invention.

Preferably, as shown in FIG. 2, step 21 specifically includes:

Step 211: After the cloud platform receives the deployment request for the new virtual machine, traverse remaining CPU resources of all active servers according to a CPU resource requirement of the new virtual machine, to search for a server available for deployment.

Step 212: If there is a server available for deployment, use a location of the server available for deployment as an optimization variable for the deployment of the new virtual machine, and perform step 213; if remaining CPU resources of all of the active servers are not suitable for the deployment of the new virtual machine, randomly switch a dormant server to an active state, deploy the new virtual machine, and perform step 214.

Step 213: Perform joint optimization on the deployment location of the new virtual machine and the fan frequency of each cooling terminal by using a genetic algorithm by using, as an optimization objective, a sum of the total power of all of the servers and the total power of all of the cooling terminals being minimum after the deployment, and by using, as constraints, a sum of resources used by all of the virtual machines running on each server not exceeding a rated total resource quantity of the server and the chip temperature of each server not exceeding a preset temperature threshold, to obtain an optimal real-time deployment location of the virtual machine and an optimal fan frequency of each cooling terminal.

The following formula:

$\min P_{total,PM+FX}(t) = \Sigma P_{PM}(t) + \Sigma P_{FX}(FP(t))$    optimization objective:

$T_{PM}(t) \leq T_{max,PM}$ and $\Sigma u_{VMi\ in\ PMk(t)} \leq C_{PM}$    optimization constraints:

$\{A(t), FP(t)\}$.    optimization variable:

In the formula, $\Sigma P_{PM}(t)$ represents a real-time total power of all of the servers, $\Sigma P_{FX}(FP(t))$ represents a total power of all of the cooling terminals, $T_{PM}(t)$ represents a chip temperature of each server, $T_{max,PM}$ represents a preset temperature threshold, $u_{VMi\ in\ PMk(t)}$ represents a sum of resources used by all of the virtual machines running on each server, and $C_{PM}$ represents a total rated resource amount of the server.

The cloud platform carries out the deployment of the new virtual machine according to the optimal real-time deployment location of the virtual machine, and the air-conditioning system controls the fan frequency of each cooling terminal according to the optimal fan frequency of each cooling terminal.

Step 214: Perform optimization on the fan frequency of each cooling terminal by using the genetic algorithm by using, as an optimization objective, a sum of the power of each cooling terminal after the deployment of the new virtual machine being minimum, and by using, as a constraint, the chip temperature of each server not exceeding the preset temperature threshold, to obtain an optimal fan frequency of each cooling terminal; the following formula:

$\min P_{total,FX}(t) = \Sigma P_{FX}(FP(t))$    optimization objective:

$T_{PM}(t) \leq T_{max,PM}$    optimization constraint:

$\{FP(t)\}$.    optimization variable:

The air-conditioning system controls the fan frequency of each cooling terminal according to the optimal fan frequency of each cooling terminal.

In the method of this embodiment, during real-time optimization, first a server for deployment of the new virtual machine is found among the active servers. If there is a server for deployment of the new virtual machine, joint optimization is performed on a deployment location of the new virtual machine and the fan frequency of each cooling terminal, so that the total power of the servers and the cooling terminals is the lowest. If there is no server for deployment of the new virtual machine, a dormant server is randomly started for performing the deployment, and the fan frequency of each cooling terminal is optimized, so that the total power of each cooling terminal is the lowest. The real-time matching degree between heat dissipation of the server and cooling supply at the terminals of the air conditioner is improved, so as to reduce the probability of occurrence of local hot spots and overcooling in the micromodule.

Figure 3:
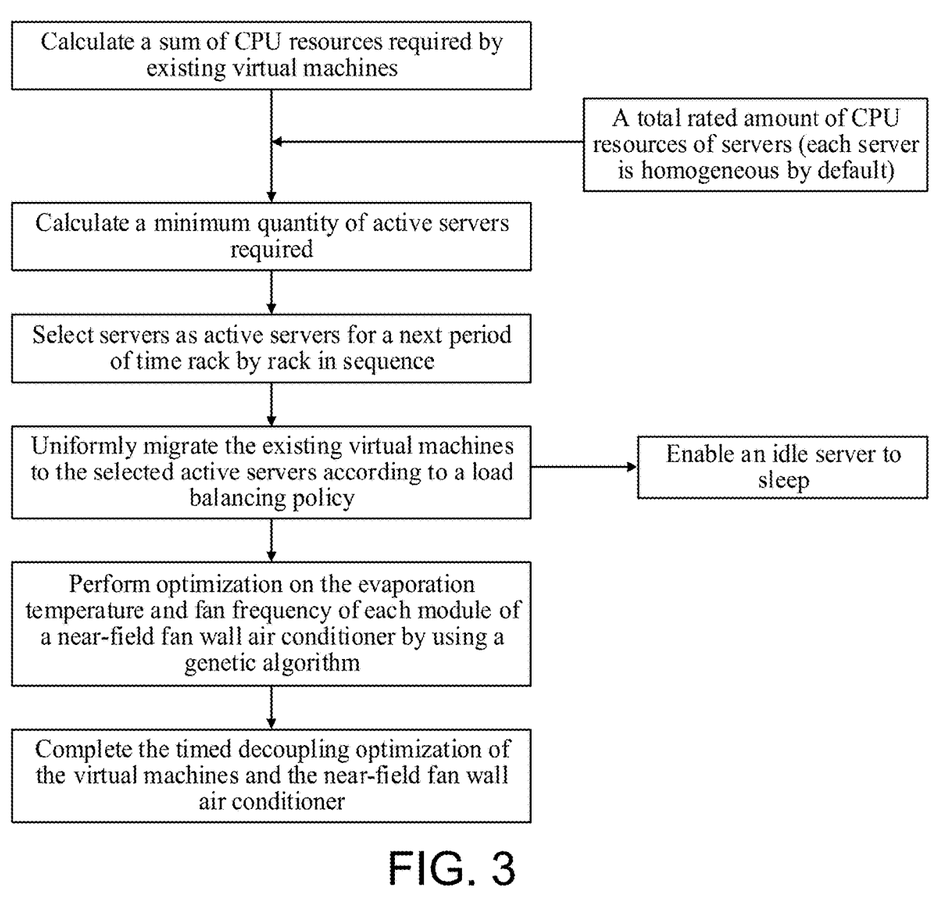
FIG. 3 is a flowchart of migrating all virtual machines and performing timed optimization on an air-conditioning system in a method according to an embodiment of the present invention.

Preferably, as shown in FIG. 3, step 22 specifically includes:

Step 221: Calculate, at a given moment, a minimum quantity of active servers needed according to a sum of a quantity of all virtual machines running on the servers and CPU resource requirements of the virtual machines.

Step 222: Select a server as an active server in a next period of time according to the minimum quantity of active servers needed and according to an order of serial numbers of racks and a descending order of the racks, until a quantity of selected servers reaches the minimum quantity of active servers. Considering that a heat dissipation effect is best under each rack, during whole migration on the virtual machine in the method of this embodiment, servers are selected from the bottom to the top in an individual rack for deployment.

Step 223: Uniformly migrate the existing virtual machines to the selected active servers according to a load balancing policy. An idle server is enabled to sleep.

Step 224: Perform optimization on the coil evaporation temperature and the fan frequency of each cooling terminal by using the genetic algorithm by using, as an optimization objective, the total power of the air-conditioning system being minimum, and by using, as a constraint, the chip temperature of each server not exceeding the preset temperature threshold, to obtain an optimal coil evaporation temperature and an optimal fan frequency of each cooling terminal.

The following formula:

$\min P_{FC}(t) = P_{CP}(T_{co}(t), T_{ev}(t)) + \Sigma P_{FX}(FP(t))$    optimization objective:

$T_{PM}(t) \leq T_{max,PM}$    optimization constraint:

$\{T_{ev}(t), FP(t)\}$.    optimization variable:

Step 225: Perform, by the air-conditioning system, regulation on the coil evaporation temperature according to the optimal coil evaporation temperature, and perform controlling on the fan frequency of each cooling terminal according to the optimal fan frequency of each cooling terminal.

In the method of this embodiment, during timed optimization, whole migration is first performed on all virtual machines, and idle servers after the migration are enabled to sleep, so that the locations of the active servers in the micromodule are more centralized, and the total power of the servers is the lowest. Then, on the basis of this, optimization is performed on the coil evaporation temperature and the fan frequency of each cooling terminal, to achieve a lowest total power of the air-conditioning system. Therefore, timing of heat dissipation from the server is highly matched with timing of cooling supply from the air conditioner, to further improve the utilization rate efficiency of the cold energy.

In the method of this embodiment, the real-time deployment optimization control is performed on the deployment of virtual machines and an air-conditioning system when there is a deployment request for a new virtual machine, to improve the real-time matching degree between heat dissipation of the servers in the near-field fan wall micromodule and cooling supply at terminals of an air conditioner, so as to reduce the probability of occurrence of local hot spots and overcooling in the micromodule, to achieve a lowest overall power of the servers and cooling terminals of the air conditioner under deployment of an individual virtual machine. However, if only real-time deployment optimization is performed, active servers are prone to be dispersed, that is, the deployment of virtual machines that can be accommodated by an individual rack server is dispersed in servers of a plurality of racks. Although the total power of the servers is not changed, because the fine regulation capability of the air conditioner terminal in a near-field fan wall is limited, dispersion of active servers is prone to cause a waste of cold energy.

Timed decoupling optimization control is performed on deployment of all virtual machines and an air-conditioning system at each given moment, to first perform whole migration on the virtual machines running on the servers, to promote centralized adjustment of active servers, thereby avoiding a waste of cold energy and minimizing the total power of the servers. Based on this, optimization is performed on the coil evaporation temperature of the air-conditioning system and the fan frequency of each cooling terminal, so as to achieve a lowest overall power of the air-conditioning system, and facilitate a high timing match between heat dissipation of the servers and cooling supply of the air conditioner, thereby further improving the utilization efficiency of cold energy. However, if only timed decoupling optimization is performed, frequent migration of virtual machines easily affects the service quality of the virtual machine, and frequent adjustment of operating conditions of the compressors is prone to cause a large decay of a life of the compressors. Therefore, a time interval for timed decoupling optimization is not easy to be excessively short, and a long time interval obviously cannot meet a requirement for real-time deployment of the virtual machine.

In the method of this embodiment, real-time deployment optimization and timed decoupling optimization are coordinated. By means of coordination of the real-time deployment optimization and the timed decoupling optimization, the technical problem that local hot spots and overcooling are prone to occur during energy-saving scheduling of a near-field fan wall micromodule can be resolved, so as to improve the overall energy efficiency and operation stability of the near-field fan wall micromodule.

In the method of the present invention, in a running process of a server, a virtual machine is automatically released (closed in real time) after a task is completed. If all virtual machines on a server are released, the server is considered as an idle server, and automatically sleeps (the real-time power is switched to 0).

The foregoing shows and describes the basic principles, main features, and advantages of the present invention. It should be understood by a person skilled in the art that the present invention is not limited by the above-described specific embodiments, and that the description in the above-described specific embodiments and the specification is merely for further illustration of the principles of the present invention, and that the present invention may be subject to various changes and modifications without departing from the spirit and scope of the present invention, which fall within the scope of the present invention as claimed.

What is claimed is:

1. A cooperative control optimization method suitable for a near-field fan wall micromodule, comprising the following steps:

step 10: obtaining information technology (IT) system scheduling data and air-conditioning system data of the near-field fan wall micromodule within a preset period of time, and separately establishing a micromodule server real-time power model, an air-conditioning system power model, and a rapid server temperature prediction model; and step 20: performing cooperative control on deployment of virtual machines and an air-conditioning system by using an optimization method of combining real-time joint optimization and timed decoupling optimization based on the micromodule server real-time power model, the air-conditioning system power model, and the rapid server temperature prediction model, wherein in the step 20, the performing cooperative control on deployment of the virtual machines and the air-conditioning system by using the optimization method of combining the real-time joint optimization and the timed decoupling optimization comprises:

step 21: when a cloud platform receives a deployment request for a new virtual machine, performing joint optimization on a deployment location of the new virtual machine and a fan frequency of each of cooling terminals, to achieve a lowest overall power of servers and each of the cooling terminals under deployment of an individual virtual machine; and step 22: at each of given moments, first performing whole migration on the virtual machines running on each of servers, so that a total power of the servers is the lowest;

then, performing optimization on a coil evaporation temperature and the fan frequency of each of the cooling terminals of the air-conditioning system, to achieve a lowest overall power of the air-conditioning system.

2. The cooperative control optimization method according to claim 1, wherein an IT system scheduling data comprises central processing unit (CPU) resource requirements of the virtual machines, mapping relationships between the virtual machines and servers, a CPU utilization rate of each of the servers, a real-time power of each of the servers, and a chip temperature of each of the servers; and the air-conditioning system data comprises the fan frequency of each of cooling terminals, a coil evaporation temperature, an outdoor unit condensing temperature, a load ratio, and a total power of the air-conditioning system.

3. The cooperative control optimization method according to claim 2, wherein in the step 10, the micromodule server real-time power model is established according to the IT system scheduling data; and the step 10 comprises:
step 101: selecting power data of each of the servers at different chip temperatures and CPU utilization rates from the IT system scheduling data;
step 102: establishing a server static power matrix according to power data of the servers in a state in which the CPU utilization rate is 0;
step 103: fitting a conversion coefficient between the CPU utilization rate and a dynamic power of each of the servers according to data of variation of the real-time power of each of the servers with the CPU utilization rate by using a multiple linear regression method, to form a conversion coefficient matrix of the CPU utilization rates and dynamic powers;
step 104: fitting an expression of a leakage power of each of the servers by using the multiple linear regression method according to different temperature data of a chip of each of the servers at a same CPU utilization rate, to form a server leakage power matrix; and
step 105: combining the server static power matrix, the conversion coefficient matrix of the CPU utilization rates and the dynamic powers, and the server leakage power matrix, to obtain the micromodule server real-time power model expressed as formula (1):

$$P_{PM}(t)=P_{SC}(t)+u_{vm}(t)*MM_{VM \to PM}(A(t),F(t))*f_h+D(T_{PM}(t)) \quad \text{formula (1)},$$

wherein $P_{PM}(t)$ represents a real-time power matrix for the servers, $P_{SC}(t)$ represents the server static power matrix, $u_{vm}(t)$ represents a CPU resource requirement matrix of the virtual machines, $MM_{VM \to PM}(A(t),F(t))$ represents a mapping matrix between the virtual machines and the servers, $A(t)$ represents a real-time deployment matrix of the virtual machines, $F(t)$ represents a virtual machine migration matrix, $u_{vm}(t)*MM_{VM \to PM}(A(t),F(t))$ represents the CPU utilization rates of all servers, $f_h$ represents the conversion coefficient matrix of the CPU utilization rates and the dynamic powers, and $D(T_{PM}(t))$ represents the server leakage power matrix.

4. The cooperative control optimization method according to claim 2, wherein in the step 10, the air-conditioning system power model expressed as formula (2) is established according to the air-conditioning system data:

$$P_{FC}(t)=P_{CP}(T_{co}(t),T_{ev}(t),PLR(t))+\Sigma P_{FX}(FP(t)) \quad \text{formula (2)},$$

wherein $P_{FC}(t)$ represents the total power of the air-conditioning system, $P_{CP}(T_{co}(t),T_{ev}(t),PLR(t))$ represents an outdoor unit power, $T_{co}(t)$ represents the coil evaporation temperature, $T_{ev}(t)$ represents the outdoor unit condensing temperature, $PLR(t)$ represents a load ratio, $FP(t)$ represents a fan frequency matrix of each of the cooling terminals, and $P_{FX}(FP(t))$ represents a power matrix for each of the cooling terminals.

5. The cooperative control optimization method according to claim 2, wherein in the step 10, the rapid server temperature prediction model is established according to the IT system scheduling data and the air-conditioning system data; and the step 10 comprises:
step 131: selecting a mapping relationship between the virtual machines and the servers, CPU resource requirements of the virtual machines, and the chip temperature of each of the servers from the IT system scheduling data, and selecting the fan frequency and the coil evaporation temperature of each of the cooling terminals from the air-conditioning system data, to form a modeling data set; and step 132: training a BP neural network model based on the modeling data set by using the fan frequency of each of the cooling terminals, the coil evaporation temperature, and the CPU utilization rate of each of the servers as input variables of the BP neural network model, and using the chip temperature of each of the servers as an output variable of the BP neural network model, to obtain the rapid server temperature prediction model.

6. The cooperative control optimization method according to claim 1, wherein the step 21 comprises:
step 211: after the cloud platform receives the deployment request for the new virtual machine, traversing remaining CPU resources of all active servers according to CPU resource requirements of the new virtual machine, to search for a server available for deployment;
step 212: if there is a server available for deployment, using a location of the server available for deployment as an optimization variable for the deployment of the new virtual machine, and performing step 213; if remaining CPU resources of all of the active servers are not suitable for the deployment of the new virtual machine, randomly switching a dormant server to an active state, deploying the new virtual machine, and performing step 214;
step 213: performing joint optimization on the deployment location of the new virtual machine and the fan frequency of each of the cooling terminals by using a genetic algorithm by using, as an optimization objective, a sum of the total power of servers and the total power of cooling terminals being minimum after the deployment, and by using, as optimization constraints, a sum of resources used by all of the virtual machines running on each of the servers not exceeding a rated total resource quantity of the server and a chip temperature of each of the servers not exceeding a preset temperature threshold, to obtain an optimal real-time deployment location of the virtual machines and an optimal fan frequency of each of the cooling terminals; carrying out, by the cloud platform, the deployment of the new virtual machine according to the optimal real-time deployment location of the virtual machines, and controlling, by the air-conditioning system, the fan frequency of each of the cooling terminals according to the optimal fan frequency of each of the cooling terminals; and
the step 214: performing optimization on the fan frequency of each of the cooling terminals by using the genetic algorithm by using, as an optimization objective, a sum of the power of each of the cooling terminals after the deployment of the new virtual machine being minimum, and by using, as a constraint, the chip temperature of each of the servers not exceeding the preset temperature threshold, to obtain the optimal fan frequency of each of the cooling terminals; and controlling, by the air-conditioning system, the fan frequency of each of the cooling terminals according to the optimal fan frequency of each of the cooling terminals.

7. The cooperative control optimization method according to claim 1, wherein the step 22 comprises:
step 221: calculating, at the given moments, a minimum quantity of active servers needed according to a sum of a quantity of all of the virtual machines running on the servers and CPU resource requirements of the virtual machines;
step 222: selecting a server as the active servers in a next period of time according to the minimum quantity of the active servers needed and according to an order of serial numbers of racks and an order of serial numbers of servers on each of racks, until a quantity of selected servers reaches the minimum quantity of the active servers;

step 223: uniformly migrating existing virtual machines to the active servers, which are selected according to a load balancing policy; enabling an idle server to sleep;

step 224: performing optimization on the coil evaporation temperature and the fan frequency of each of the cooling terminals by using a genetic algorithm by using, as an optimization objective, the total power of the air-conditioning system being minimum, and by using, as a constraint, a chip temperature of each of the servers not exceeding a preset temperature threshold, to obtain an optimal coil evaporation temperature and an optimal fan frequency of each of the cooling terminals; and step 225: performing, by the air-conditioning system, regulation on the coil evaporation temperature according to the optimal coil evaporation temperature, and performing control on the fan frequency of each of the cooling terminals according to the optimal fan frequency of each of the cooling terminals.

\* \* \* \* \*

UNITED STATES PATENT AND TRADEMARK OFFICE
CERTIFICATE OF CORRECTION

PATENT NO. : 12,449,150 B1  
APPLICATION NO. : 19/227423  
DATED : October 21, 2025  
INVENTOR(S) : Ligang Wang et al.

Page 1 of 1

It is certified that error appears in the above-identified patent and that said Letters Patent is hereby corrected as shown below:

On the Title Page

Item (71) Applicants should read: CHINA CONSTRUCTION INDUSTRIAL & ENERGY ENGINEERING GROUP CO., LTD., Jiangsu (CN); Nanjing Tech University, Jiangsu (CN)

Item (72) Inventors should read: Ligang Wang, Jiangsu (CN); Depeng Li, Jiangsu (CN); Tao Deng, Jiangsu (CN); Wei Liu, Jiangsu (CN); Yumao Lin, Jiangsu (CN); Meng Li, Jiangsu (CN); Qing Huang, Jiangsu (CN); Yizhe Xu, Jiangsu (CN); Chengchu Yan, Jiangsu (CN)

Signed and Sealed this  
Thirteenth Day of January, 2026

John A. Squires  
*Director of the United States Patent and Trademark Office*